US009497650B2

(12) United States Patent
Nagata et al.

(10) Patent No.: US 9,497,650 B2
(45) Date of Patent: Nov. 15, 2016

(54) RADIO COMMUNICATION METHOD, RADIO BASE STATION, USER TERMINAL, AND RADIO COMMUNICATION SYSTEM

(71) Applicant: NTT DOCOMO, INC., Tokyo (JP)

(72) Inventors: Satoshi Nagata, Tokyo (JP); Kazuaki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 14/387,697

(22) PCT Filed: Mar. 28, 2013

(86) PCT No.: PCT/JP2013/059349
§ 371 (c)(1),
(2) Date: Sep. 24, 2014

(87) PCT Pub. No.: WO2013/147067
PCT Pub. Date: Oct. 3, 2013

(65) Prior Publication Data
US 2015/0043372 A1  Feb. 12, 2015

(30) Foreign Application Priority Data

Mar. 30, 2012  (JP) .................................. 2012-081483

(51) Int. Cl.
*H04L 12/26* (2006.01)
*H04W 24/08* (2009.01)
(Continued)

(52) U.S. Cl.
CPC ............ *H04W 24/08* (2013.01); *H04L 5/0035* (2013.01); *H04L 5/0053* (2013.01); *H04L 5/0057* (2013.01);
(Continued)

(58) Field of Classification Search
CPC .................. H04W 24/08; H04W 24/10; H04L 5/0035; H04L 5/0053; H04L 5/0057; H04L 1/0026; H04L 25/0224
See application file for complete search history.

(56) References Cited

U.S. PATENT DOCUMENTS 8,494,079 B2   7/2013  Jung et al.
8,644,827 B2   2/2014  Yamada et al.
(Continued)

FOREIGN PATENT DOCUMENTS

WO   2010/073830 A1   7/2010
WO   2011/025152 A2   3/2011

OTHER PUBLICATIONS

International Search Report issued in PCT/JP2013/059349 mailed on Jun. 11, 2013 (2 pages).
(Continued)

*Primary Examiner* — Kevin Mew
(74) *Attorney, Agent, or Firm* — Osha Liang LLP

(57) ABSTRACT

The present invention is designed to enable adequate channel quality measurement in a user terminal even when CSI-RS transmission parameters are reported from a plurality of transmission points to the user terminal. In a radio communication method for a plurality of radio base stations and a user terminal having ability to receive a reference signal for channel state measurement from the plurality of radio base stations, the radio base station generates report information, which is formed with information that represents a transmission parameter of the reference signal, and system information that includes at least a system bandwidth of a radio base station that transmits the reference signal, and reports the generated report information to the user terminal
(Continued)

by means of higher layer signaling, and the user terminal measures channel quality based on the received report information.

17 Claims, 9 Drawing Sheets

(51) Int. Cl.
*H04L 5/00* (2006.01)
*H04W 24/10* (2009.01)
*H04L 25/02* (2006.01)
*H04L 1/00* (2006.01)

(52) U.S. Cl.
CPC .......... *H04L 1/0026* (2013.01); *H04L 25/0224* (2013.01); *H04W 24/10* (2013.01)

(56) References Cited

U.S. PATENT DOCUMENTS

| | | | | |
|---|---|---|---|---|
| 9,148,818 B2* | 9/2015 | Yue | ............ | H04L 5/001 |
| 2009/0303953 A1* | 12/2009 | Kang | ............ | H04W 68/025 |
| | | | | 370/329 |
| 2010/0272004 A1* | 10/2010 | Maeda | ............ | H04L 5/0007 |
| | | | | 370/312 |
| 2010/0303039 A1* | 12/2010 | Zhang | ............ | H04L 5/0035 |
| | | | | 370/331 |
| 2011/0103291 A1* | 5/2011 | Wiberg | ............ | H04B 7/15542 |
| | | | | 370/315 |
| 2011/0317748 A1* | 12/2011 | Li | ............ | H04B 7/0417 |
| | | | | 375/219 |
| 2012/0009959 A1* | 1/2012 | Yamada | ............ | H04B 7/0413 |
| | | | | 455/507 |
| 2012/0020230 A1* | 1/2012 | Chen | ............ | H04L 1/0028 |
| | | | | 370/252 |
| 2012/0115469 A1* | 5/2012 | Chen | ............ | H04W 36/0094 |
| | | | | 455/434 |
| 2012/0257515 A1* | 10/2012 | Hugl | ............ | H04W 24/10 |
| | | | | 370/252 |
| 2013/0010707 A1* | 1/2013 | Gaal | ............ | H04L 5/003 |
| | | | | 370/329 |
| 2013/0021925 A1* | 1/2013 | Yin | ............ | H04B 7/024 |
| | | | | 370/252 |
| 2013/0039284 A1* | 2/2013 | Marinier | ............ | H04L 5/001 |
| | | | | 370/329 |
| 2013/0051240 A1* | 2/2013 | Bhattad | ............ | H04L 5/005 |
| | | | | 370/241 |
| 2013/0084849 A1* | 4/2013 | Koskinen | ............ | H04W 36/0088 |
| | | | | 455/422.1 |

OTHER PUBLICATIONS

NTT DOCOMO; "Higher layer signaling of CSI-RS and muting configurations"; 3GPP TSG RAN WG2 Meeting #62bis, R2-110115; Dublin, Ireland; Jan. 17-21, 2011 (3 pages).
Intel Corporation; "Discussion on bandwidth configuration of CSI-RS"; 3GPP TSG-RAN WG1 #68bis, R1-121518; Jeju, Korea; Mar. 26-30, 2012 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN); (Release 7)"; Sep. 2006 (57 pages).
Notification of Reasons for Rejection issued in the counterpart Japanese Patent Application No. 2012-081483, mailed Jan. 12, 2016 (6 pages).
Office Action issued in the counterpart Japanese Patent Application No. 2012081483, mailed Aug. 9, 2016 (4 pages).
Intel Corporation; "Configuration of CSI-RS based CoMP RRM measurements"; 3GPP TSG-RAN WG2 #77bis, R2-121749; Jeju, Korea; Mar. 26-30, 2012 (5 pages).

* cited by examiner

RADIO COMMUNICATION METHOD, RADIO BASE STATION, USER TERMINAL, AND RADIO COMMUNICATION SYSTEM

TECHNICAL FIELD

The present invention relates to a radio communication method, a radio base station, a user terminal and a radio communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) has been agreed upon for the purposes of further increasing high-speed data rates, providing low delay, and so on (non-patent literature 1). In the LTE system, as a multiplexing scheme, OFDMA (Orthogonal Frequency Division Multiple Access), which is different from W-CDMA, is applied to downlink channels (downlink).

In a third-generation system, a transmission rate of maximum approximately 2 Mbps can be achieved on the downlink by using a fixed band of approximately 5 MHz. Meanwhile, in an LTE system, it is possible to achieve a transmission rate of about maximum 300 Mbps on the downlink and about 75 Mbps on the uplink, by using a variable band which ranges from 1.4 MHz to 20 MHz. Furthermore, with the UMTS network, successor systems of LTE are also under study for the purpose of achieving further broadbandization and higher speed (for example, "LTE-advanced" (LTE-A system)).

In the downlink of the LTE system, a CRS (Common Reference Signal), which is a reference signal that is common between cells, is defined. This CRS is used to demodulate transmission data, and, besides, used to measure downlink channel quality (CQI: Channel Quality Indicator) for scheduling and adaptive control, and to measure an average downlink propagation path state for cell search and handover (mobility measurement).

Meanwhile, in the downlink of a successor system of LTE (LTE-A system), in addition to the CRS, a CSI-RS (Channel State Information Reference Signal) is under study as a reference signal for channel state measurement. The CSI-RS supports channel quality measurement of multiple cells taking into account the transmission/reception of data channel signals between multiple cells such as coordinated multiple point transmission/reception (CoMP: Coordinated Multiple Point). The CSI-RS is used to measure the channel quality of neighboring cells, and, in this regard, differs from the CRS that is used to measure the channel quality of the serving cell alone.

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

In Rel-10 LTE, which is one type of LTE-A, a heterogeneous network (HetNet) configuration to place significance on the local area environment, in addition to the conventional cellular environment, is employed. Also, as described above, in LTE Rel-11 and later versions, coordinated multiple point transmission/reception (CoMP) is under study as a technique to realize inter-cell orthogonalization for improved system performance.

When radio communication is performed between a plurality of radio base stations (transmission points) and a user terminal, the user terminal measures channel quality at each transmission point based on CSI-RSs transmitted from the plurality of transmission points. When doing so, the user terminal needs to measure the channel quality of each transmission point with reference to information (CSI-RS-Config) that represents the CSI-RS transmission parameters (position, sequence, transmission power, etc.), reported from the radio base stations. However, in this case, the user terminal is unable to know the relationship between a plurality of CSI-RSs transmitted from each transmission point and the system information of each transmission point (system bandwidth and so on), and therefore there is a threat that the accuracy of channel quality measurement might lower.

Also, in a layered network like a HetNet, controlling radio communication by applying the same cell ID between a radio base station (for example, a macro base station) of a large cell covering a relatively wide area, and a radio base station (for example, a pico base station, a femto base station, an RRH base station, and so on) of a small cell covering a relatively narrow area, is under study. In this case, there is a threat that, even if the cell ID and CSI-RS transmission parameters are linked, the user terminal is unable to identify the system information that corresponds to each CSI-RS transmitted from a plurality of transmission points. As a result of this, there is a threat that the accuracy of channel quality measurement in the user terminal lowers.

The present invention has been made in view of the above, and it is therefore an object of the present invention to provide a radio communication method, a radio base station, a user terminal and a radio communication system which allow adequate channel quality measurement in a user terminal even when CSI-RS transmission parameters are reported from a plurality of transmission points to the user terminal.

Solution to Problem

A radio communication method of the present invention is a radio communication method for a plurality of radio base stations and a user terminal having ability to receive a reference signal for channel state measurement from the plurality of radio base stations, and this radio communication method includes: in the radio base station, generating report information, which is formed with information that represents a transmission parameter of the reference signal, and system information that includes at least a system bandwidth of a radio base station that transmits the reference signal, and reporting the generated report information to the user terminal by means of higher layer signaling, and measuring, in the user terminal, channel quality based on the received report information.

Technical Advantage of the Invention

According to the present invention, it is possible to perform adequate channel quality measurement in a user terminal even when CSI-RS transmission parameters are reported from a plurality of transmission points to the user terminal.

DESCRIPTION OF EMBODIMENTS

The radio communication method, radio base station, user terminal and radio communication system according to the present invention are applicable to LTE/LTE-A systems and so on, which are each one type of a next-generation radio communication system. First, an overview of a HetNet in the LTE/LTE-A systems will be described. Note that, although large cells such as macro cells (hereinafter referred to as "macro cells") and small cells such as pico cells and femto cells (hereinafter referred to as "pico cells") will be illustrated as examples in the following description, the radio communication system is by no means limited to this configuration.

Figure 1:
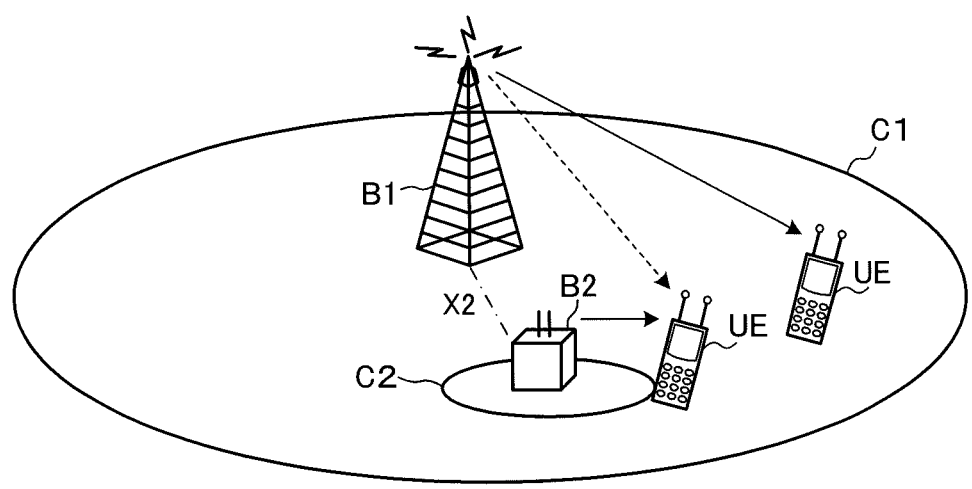
FIG. 1 is a diagram to explain an overview of a heterogeneous network.

FIG. 1 shows an overview of a HetNet. A HetNet is a layered network in which, in addition to a conventional macro cell C1, cells of various formats such as a pico cell C2 are overlaid. In this HetNet, the transmission point B1 of the macro cell C1 covering a relatively wide area (radio base station (hereinafter referred to as "macro base station")) is configured to have greater downlink transmission power than the transmission point B2 of the pico cell C2 covering a relatively narrow area (radio base station (hereinafter referred to as "pico base station")). Note that information (timing information, radio resource allocation information such as scheduling, and so on) may be exchanged between the macro base station B1 and the pico base station B2 via wire connection (for example, an X2 interface).

Also, in the LTE-A system, coordinated multiple point transmission/reception (CoMP) techniques are under study as techniques to realize inter-cell orthogonalization. In this CoMP transmission/reception, a plurality of transmission points coordinate and perform signal processing for transmission and reception for one user terminal UE or for a plurality of user terminal UEs. For example, for the downlink, simultaneous transmission of a plurality of cells adopting precoding, coordinated scheduling/beam forming and so on are under study. By applying these CoMP transmission/reception techniques, improvement of throughput performance is expected, especially with respect to user terminal UEs located on cell edges.

To apply CoMP transmission/reception techniques, it is necessary to feed back channel state information (CSI) for a plurality of transmission points, such as channel quality indicators (CQIs), from a user terminal to a radio base station. As for the configuration to implement CoMP transmission/reception, a configuration (centralized control based on an RRE configuration) to include a plurality of remote radio equipment (RREs) that are connected with a radio base station (radio base station eNB) by optical fiber and so on is under study. Note that the radio base station (transmission point) according to the present embodiment is a concept to cover radio base station eNBs and remote radio equipment.

Assuming techniques that involve coordination between multiple cells such as ones described above, a user terminal has to measure channel quality in other cells (a plurality of transmission points), in addition to measuring channel quality in its own cell, and send feedback to the serving cell and others. In this case, the user terminal generates and feeds back CSI on a per cell basis, based on reference signals for channel state measurement (CSI-RSs) transmitted from each transmission point.

A CSI-RS is a reference signal that is used to measure CQI, PMI (Precoding Matrix Indicator), and RI (Rank Indicator) and so on as a channel state. Unlike a CRS allocated to all subframes, the CSI-RS is allocated in a predetermined cycle—for example, in a ten-subframe cycle. Also, the CSI-RS is specified by information (SI-RS-Config) that represents transmission parameters such as position, sequence, transmission power and so on. The position of the CSI-RS includes subframe offset, cycle and subcarrier-symbol offset (index).

In one resource block defined in LTE, CSI-RSs are allocated not to overlap with control signals such as PDCCH (Physical Downlink Control Channel) signals, user data such as PDSCH (Physical Downlink Shared Channel) signals, and other reference signals such as CRSs (Cell-specific Reference Signals) and DM-RSs (Demodulation-Reference Signals).

One resource block is formed with twelve subcarriers that are consecutive in the frequency direction and fourteen symbols that are consecutive in the time axis direction. From the perspective of suppressing the PAPR (Peak-to-Average Power Ratio), two resource elements that neighbor each other in the time axis direction are allocated as a set, as resources which can transmit CSI-RSs.

Figure 2A:
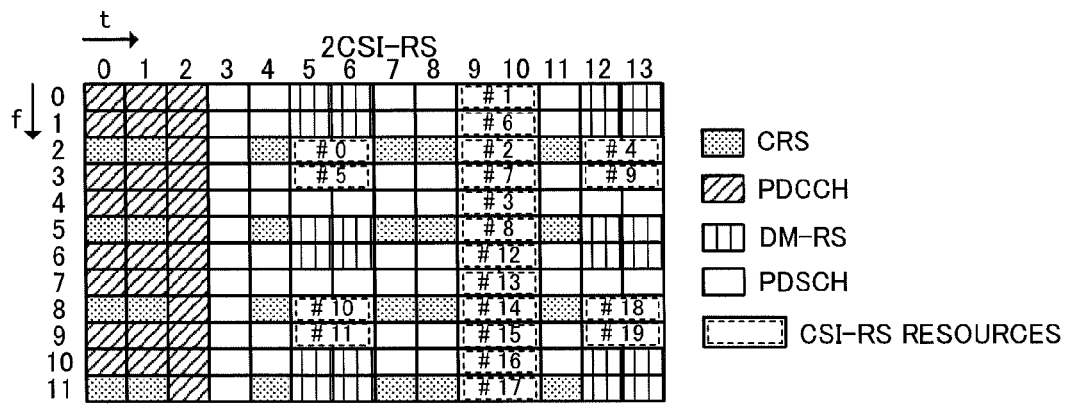
FIG. 2 provides diagrams to explain CSI-RS allocation patterns in resource blocks.
Figure 2B:
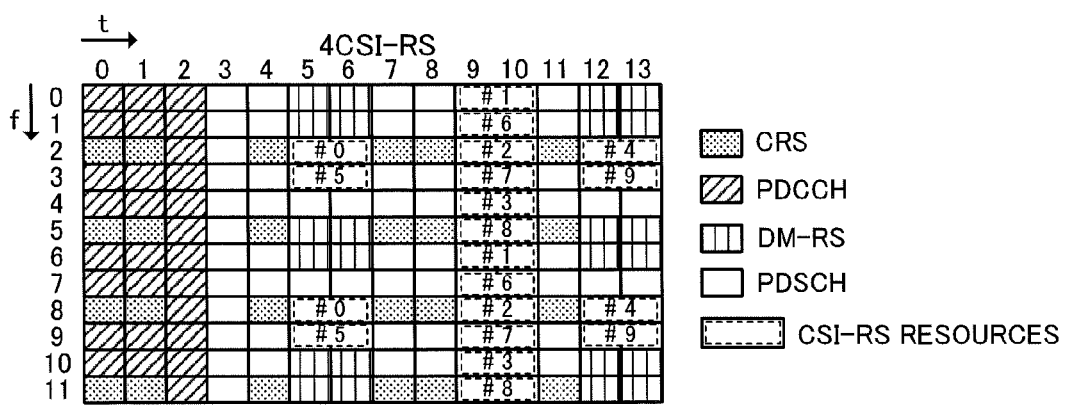

In the CSI-RS configurations shown in FIG. 2, forty resource elements are secured as CSI-RS resources (reference signal resources). In these forty resource elements, CSI-RS patterns are set in accordance with the number of CSI-RS ports (the number of antennas). In each CSI-RS pattern, one resource element is allocated for a CSI-RS, for every one CSI-RS port. When the number of CSI-RS ports is two, CSI-RSs are allocated to two resource elements among the forty resource elements. Consequently, in FIG. 2A, twenty CSI-RS patterns, designated by indices #0 to #19 (CSI configurations=0 to 19), are set. Here, for ease of explanation, resource elements constituting one same pattern are assigned the same index.

Figure 2C:
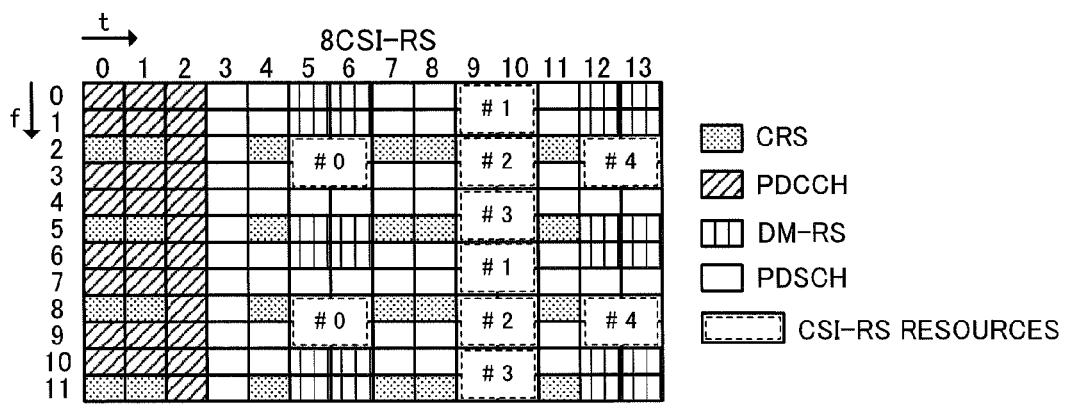

When the number of CSI-RS ports is four, CSI-RSs are allocated to four resource elements among the forty resource elements. Consequently, in FIG. 2B, ten patterns of CSI-RS patterns, designated by indices #0 to #9 (CSI configurations=0 to 9), are set. When the number of CSI-RS ports is eight, CSI-RSs are allocated to eight resource elements among the forty resource elements. Consequently, as shown in FIG. 2C, five patterns of CSI-RS patterns, designated by indices #0 to #4 (CSI configurations=0 to 4), are set. Note that, in the CSI-RS patterns, user data is allocated to resource elements where CSI-RSs are not allocated. Then, with the CSI-RSs, a different CSI-RS pattern (CSI configuration) is selected for every cell, thereby preventing interference between cells.

Also, in LTE Rel-10, when subframes in which CSI-RSs are transmitted and subframes in which paging is multiplexed or subframes in which broadcast information such as SIBs (System Information Blocks) and MIBs (Master Information Blocks) are multiplex crash, the CSI-RSs are not transmitted. The radio base station reports information about the above subframes where paging and so on are multiplexed, to the user terminal.

Now, assuming techniques that involve coordination between multiple cells, under study in LTE Rel-11 and later versions, such as CoMP, for example, a user terminal needs to measure channel quality using the CSI-RSs of other cells, in addition to the CSI-RS of its own cell. That is, the user terminal needs to measure channel quality at each transmission point with reference to CSI-RS transmission parameters reported from a plurality of transmission points. In this case, there is a threat that the user terminal is unable to know the correspondence between a plurality of CSI-RSs (CSI-RS transmission parameters) transmitted from each transmission point, and the system information at each transmission point (system bandwidth and so on). As a result, there is a threat that the user terminal applies wrong system information to channel quality measurement, and, as a result of this, the accuracy of channel quality measurement lowers.

Meanwhile, in techniques involving coordination between multiple cells, study is going on to allow the radio base stations (transmission points) of neighboring cells to adopt the same cell ID and perform radio communication control (shared cell ID scenario). For example, a case may be possible where neighboring cells (for example, a macro cell and a pico cell) having coverage areas that overlap at least in part use the same cell ID. Also, in CoMP transmission/reception, a case may be possible where a radio base station and an RRE perform radio communication control by applying the same cell ID.

In this case, a user terminal cannot learn the associations between CSI-RSs transmitted from each cell's transmission point and each cell's system information (for example, system bandwidth) from the cell IDs. Consequently, there is a threat that the user terminal applies wrong system information to channel quality measurement, and, as a result of this, the accuracy of channel quality measurement lowers.

For example, when CSI-RSs are transmitted from a macro cell and pico cells having the same cell ID and varying system bandwidths, if the system bandwidth of the serving cell is applied to each cell's CSI-RS, the accuracy of channel quality measurement for the neighboring cells decreases. In particular, when the system bandwidth of the neighboring cells (for example, 5 MHz) is smaller than the system bandwidth of the serving cell (for example, 10 MHz), there is a threat that the accuracy of channel quality measurement for the neighboring cells decreases significantly.

The present inventors have focused on the fact that the system information (system bandwidth and so on) which a user terminal references when measuring channel quality based on CSI-RSs transmitted from a plurality of radio base stations (transmission points) is reported by means of dedicated signals (higher layer signaling). Then, the present inventors have found that, by associating (linking) CSI-RS transmission parameters such as the position, the sequence, transmission power and so on, and the system information of transmission points that transmit CSI-RSs, and reporting these to the user terminal, it is possible to carry out adequate channel quality measurement even when a plurality of CSI-RSs are received.

Also, the present inventors have found out that it is possible to reduce the amount of signaling by gathering the system information (system bandwidth and so on) of a plurality of transmission points that transmit CSI-RSs and reporting these to user terminals as predetermined information elements by means of dedicated signals (higher layer signaling).

Now, the present embodiment will be described below in detail with reference to the accompanying drawings. Note that, although cases will be exemplified in the following description where a plurality of neighboring radio base stations (transmission points) carry out radio communication control by applying the same cell ID (shared cell ID scenario), the present embodiment is by no means limited to this. The present embodiment is equally applicable to cases where CSI-RS transmission parameters are transmitted from a plurality of transmission points to a user terminal.

(First Embodiment)

With the first embodiment, report information that is formed with information (CSI-RS-Config) which represents CSI-RS transmission parameters and system information which the transmission points to transmit CSI-RSs operate on, are reported to a user terminal by means of dedicated signals (for example, RRC signaling). The system information may be the system bandwidth of the transmission points, information about the subframes where broadcast information (MIBs and/or SIBs and so on) is multiplexed, and information about the subframes where paging information is multiplexed. It is also possible to define these pieces of system information as parameters of information (CSI-RS-Config) representing CSI-RS transmission parameters, and report them to a user terminal.

Figure 3:
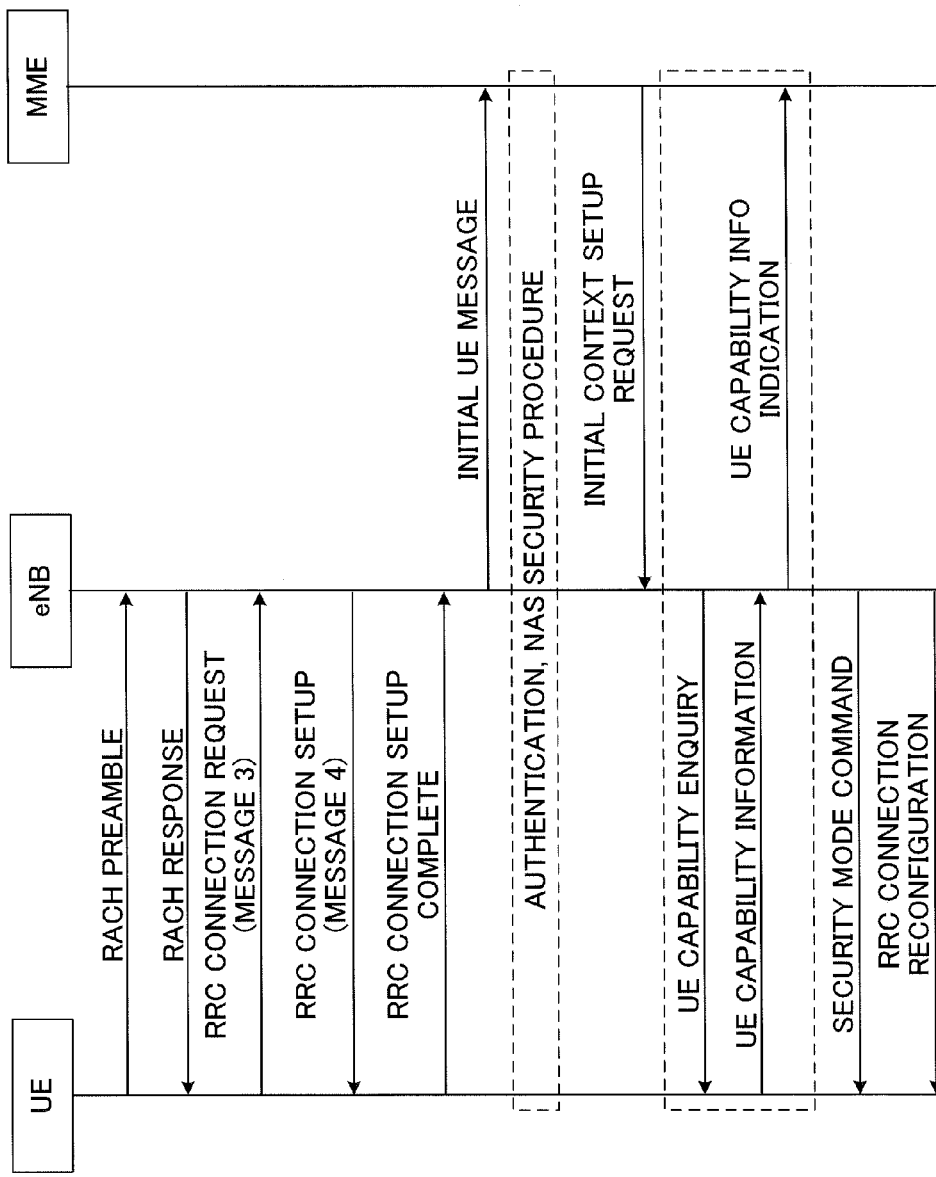
FIG. 3 is a diagram to show a sequence when report information is reported by means of dedicated signals.

Also, the radio base station can include information in which the above system information is defined as CSI-RS-Config parameters in a connection reconfiguration signal (RRC CONNECTION RECONFIGURATION signal) and report this to a user terminal. Now, the transmission timing of the connection reconfiguration signal will be described below with reference to FIG. 3.

First, a user terminal UE transmits an RACH preamble to a radio base station eNB. Upon receiving the RACH preamble, the radio base station eNB transmits an RACH response to the user terminal UE. Next, the user terminal UE transmits an RRC CONNECTION REQUEST (Message 3) to the radio base station eNB. Upon receiving the RRC CONNECTION REQUEST (Message 3), the radio base station eNB transmits an RRC CONNECTION SETUP (Message 4) to the user terminal UE.

Upon receiving the RRC CONNECTION SETUP (Message 4), the user terminal UE transmits an RRC CONNECTION SETUP COMPLETE to the radio base station eNB.

Upon receiving the RRC CONNECTION SETUP COMPLETE, the radio base station eNB transmits an INITIAL UE MESSAGE to a mobility management node MME. By this means, authentication and NAS security procedures are executed between the user terminal UE and the mobility management node MME. After that, the mobility management node MME transmits an INITIAL CONTEXT SETUP REQUEST to the radio base station eNB.

Note that, when a UE CAPABILITY is not included in the INITIAL CONTEXT SETUP REQUEST, the radio base station eNB transmits a UE CAPABILITY ENQUIRY to the user terminal UE. Upon receiving the UE CAPABILITY ENQUIRY, the user terminal UE transmits a UE CAPABILITY INFORMATION to the radio base station eNB. Then, the radio base station eNB transmits a UE CAPABILITY INFO INDICATION to the mobility management node MME.

Next, the radio base station eNB transmits a SECURITY MODE COMMAND to the user terminal UE. After that, the radio base station eNB transmits an RRC CONNECTION RECONFIGURATION, which includes the report information (CSI-RS-Config), to the user terminal UE.

Figure 4:
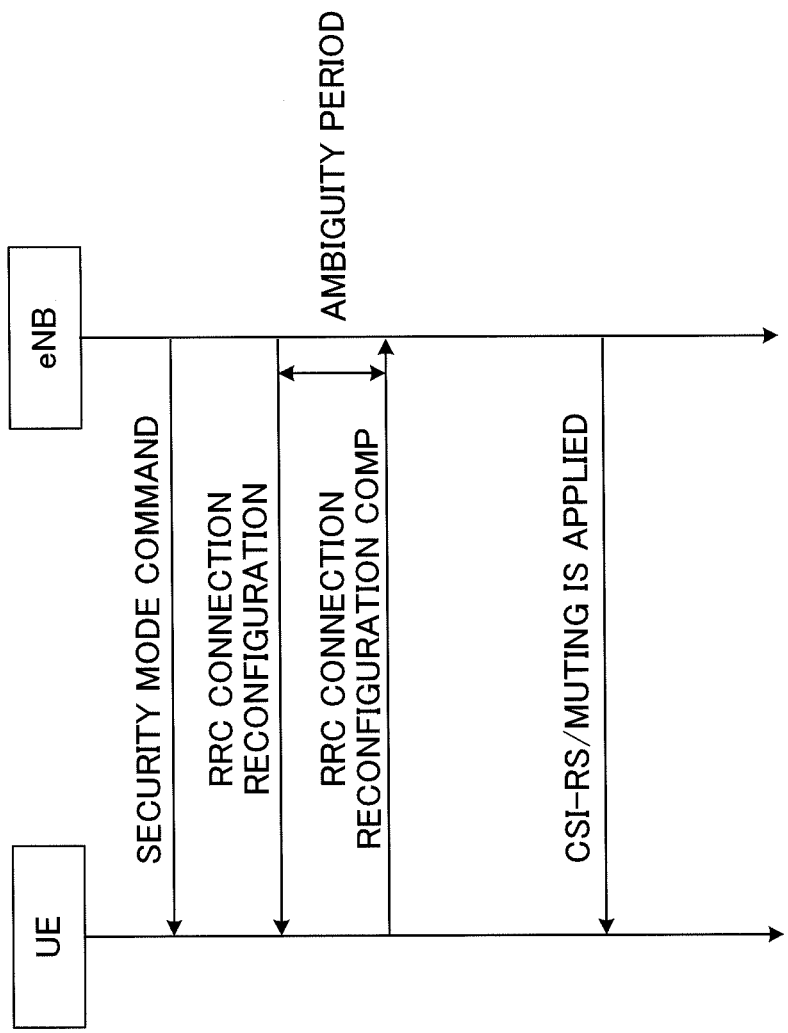
FIG. 4 is a diagram to show a sequence when report information is reported by means of dedicated signals.

After that, as shown in FIG. 4, upon receiving the RRC CONNECTION RECONFIGURATION, the user terminal UE transmits an RRC CONNECTION RECONFIGURATION COMP to the radio base station eNB. After having received the RRC CONNECTION RECONFIGURATION COMP—that is, after the ambiguity period is over-the radio base station eNB begins to stop, in subframes that transmit CSI-RSs, transmitting downlink data for the user terminal UE and transmitting downlink data for neighboring cells (CSI-RS/muting).

In this way, the radio base station signals CSI-RS transmission parameters to the user terminal separately, with the transmission timing of the connection reconfiguration signal (by including them in the connection reconfiguration signal). In this case, it is possible to reduce unnecessary reporting of information to other user terminals.

Also, with the present embodiment, it suffices to define at least one of the system bandwidth, information about subframes where broadcast information (for example, SIB 1) is multiplexed, and information about subframes where paging information is multiplexed, as a CSI-RS transmission parameter. In this case, other pieces of system information may also be reported with the transmission timing of the connection reconfiguration signal as well.

Upon receiving the report information reported from the radio base station, the user terminal measures channel quality based on that report information. To be more specific, the user terminal measures channel quality based on CSI-RSs transmitted from each transmission point, with reference to the CSI-RS transmission parameters reported from each transmission point, and the system information (system bandwidth and so on) that is associated with the CSI-RS transmission parameters. By this means, the user terminal can learn the association between CSI-RSs transmitted from each transmission point, and system information, so that it is possible to measure channel quality in a plurality of transmission points (for example, the serving cell and neighboring cells) adequately.

Note that the radio base station can acquire information which represents the CSI-RS transmission parameters of neighboring cells and system information such as the system bandwidths and so on, from the radio base stations of the neighboring cells. For example, a predetermined radio base station (serving point) is able to acquire these pieces of information from the radio base stations of neighboring cells via an X2 interface and so on.

When neighboring radio base stations (transmission points) apply the same cell ID and each transmission point (for example, transmission point TP #1 or TP #2) operates on a unique system bandwidth, a user terminal that sees TP #1 as the serving point is unable to know the system bandwidth of TP #2. Consequently, there is a problem that, when a CSI-RS is transmitted from TP #2 to that user terminal, channel quality measurement is performed by applying the system bandwidth of TP #1, and therefore the accuracy of channel quality measurement lowers.

Meanwhile, with the present embodiment, report information, in which information to represent the CSI-RS transmission parameters which TP #2 reports and the system information (system bandwidth and so on) of this TP #2 are linked, is signaled to the user terminal separately. Consequently, the user terminal can know system information (system bandwidth and so on) corresponding to CSI-RS transmission parameters reported from a transmission point apart from the serving point (here, TP #2). By this means, even when the same cell ID applies between multiple neighboring cells, it is possible to perform adequate channel quality measurement for each cell based on CSI-RSs transmitted from the multiple cells.

Also, by reporting CSI-RS transmission parameters and information about subframes where broadcast information (MIBs and/or SIBs and so on), paging information and so on are multiplexed to a user terminal by means of dedicated signals, it is possible to prevent a clash between subframes to transmit CSI-RSs and subframes where paging information and so on are multiplexed, between multiple cells.

(Second Embodiment)

With the second embodiment, the system information of neighboring transmission points that transmit CSI-RSs is gathered and reported to a user terminal as predetermined information elements (IEs) by means of dedicated signals (for example, RRC signaling). The system information of each transmission point may be the system bandwidth, information about subframes where broadcast information included in MIBs and SIBs and so on is multiplexed, information about subframes where paging information is multiplexed, the number of CSI-RS antenna ports and so on.

These pieces of system information may be signaled to a user terminal as predetermined information elements (IEs) with the timing to transmit a connection reconfiguration signal. For example, as physical config dedicated IEs, which are used to define user terminal-specific physical channel configurations, these pieces of system information (system bandwidth, information about subframes where broadcast information included in MIBs, SIBs and so on is multiplexed, information about subframes where paging information is multiplexed, the number of CSI-RS antenna ports, and so on) are reported to a user terminal through RRC signaling.

In this way, by gathering the system information in a plurality of transmission points into predetermined information elements and reporting these to a user terminal by means of dedicated signals, it is possible to reduce the amount of higher layer signaling.

Also, when the system information (system bandwidth and so on) in a plurality of transmission points is gathered and reported, the case where the information which a user terminal uses when measuring channel quality is selected from the system information of the transmission points and reported (example 1), and the case where the system information of each transmission point is reported separately (example 2) may be applicable. Now, examples 1 and 2 will be described below.

EXAMPLE 1

In example 1, a predetermined radio base station (for example, the radio base station which a user terminal is connected to) selects the information to use when a user terminal measures channel quality, from the system information of each transmission point, and reports this to the user terminal as a predetermined information element, by means of dedicated signals.

The radio base station selects the minimum system bandwidth from the system bands of the transmission points and reports this to the user terminal. For example, when the system bands which neighboring transmission points (for example, a first transmission point (TP #1) and a second transmission point (TP #2)) operate on are a 5 MHz band and a 10 MHz band, respectively, a predetermined transmission point (for example, the serving point) selects the 5 MHz band and reports this to the user terminal.

This is because, when channel quality measurement is carried out based on a CSI-RS transmitted from a transmission point where the system bandwidth is relatively narrow (for example, 5 MHz), channel quality measurement cannot be carried out, or its accuracy decreases significantly, by applying a relatively wide system bandwidth (for example, 10 MHz). In this way, by selecting and reporting the minimum system bandwidth from the system band of each transmission point, the user terminal is able to perform channel quality measurement with predetermined quality or above, with respect to a plurality of transmission points.

Also, as information about subframes where paging information is multiplexed, the radio base station selects information about subframes where at least one of the transmission points multiplexes paging information, and reports this to the user terminal. For example, at neighboring transmission points (for example, TP #1 and TP #2), when TP #1 transmits paging information in subframe numbers #4 and #9 and TP #2 transmits paging information in subframe number #9, subframe numbers #4 and #9 are selected and reported to the user terminal.

By this means, the user terminal can know the subframes where paging information is transmitted from each neighboring transmission point, so that it is possible to effectively prevent a clash with CSI-RSs. Note that information about subframes where broadcast information included in MIBs and SIBs and so on is multiplexed can be controlled alike.

Also, as the number of antenna ports to be used to transmit CSI-RSs, the radio base station selects the minimum number of antenna ports from the number of CSI-RS antenna ports at each transmission point (radio base station), and reports this to the user terminal. For example, the number of CSI-RS antenna ports at TP #1 is two and the number of CSI-RS antenna ports at TP #2 is four, two is reported as the number of CSI-RS antenna ports.

By reporting the minimum number of CSI-RS antenna ports to the user terminal, it is possible to reduce the amount of RRC signaling compared to the case of reporting each transmission point's antenna ports. Also, since the combination of the number of antenna ports to carry out channel quality measurement using CSI-RSs can be reduced at the user terminal, it is possible to reduce the complication of processes at the user terminal.

Note that it is equally possible to report the number of CSI-RS antenna ports at the transmission point of each cell to the user terminal.

EXAMPLE 2

In example 2, when the system information of a plurality of transmission points is gathered into predetermined information elements and reported to a user terminal by means of dedicated signals, the radio base station reports the system information of each transmission point to the user terminal. In this case, for each system information (system bandwidth, information about subframes where broadcast information is multiplexed, information about subframes where paging information is multiplexed, the number of CSI-RS antenna ports and so on), information of each transmission point is reported individually.

For example, as the system bandwidth, the radio base station reports the system band of each transmission point to the user terminal. When the system bands which TP #1 and TP #2 operate on are a 5 MHz band and a 10 MHz band, respectively, both the 5 MHz band and the 10 MHz band are reported to the user terminal by means of dedicated signals (RRC signaling).

Also, as for information about subframes where paging information is multiplexed, each transmission point and subframe information are associated with each other and reported. For example, when paging information is transmitted in subframe numbers #4 and #9 at TP #1 and paging information is transmitted in subframe number #9 at TP #2, as information about subframes where paging information is multiplexed, information to indicate "subframe numbers #4 and #9 at TP #1 and subframe number #9 at TP #2" is reported. Note that information about subframes where broadcast information included in MIBs, SIBs and so on is multiplexed can be controlled alike.

Also, as the number of antenna ports to use to transmit CSI-RSs, the radio base station associates the number of CSI-RS antenna ports at each transmission point with the transmission points, and reports these. For example, when the number of CSI-RS antenna ports at TP #1 is two and the number of CSI-RS antenna ports at TP #2 is four, information to indicate that "the number of antenna ports at TP #1 is two and the number of antenna ports at TP #2 is four" is reported.

Note that, with example 2, by linking the system information of each transmission point and the indices of CSI-RS parameters transmitted from these transmission points, the user terminal can measure channel quality at each transmission point adequately, based on CSI-RS transmission parameters transmitted from a plurality of transmission points. Also, when the cell ID is the same between neighboring cells, the user terminal can adequately identify the system information to correspond to the CSI-RS transmission parameters reported from each transmission point, and measure channel quality.

Also, as shown in example 2, when the system information of each transmission point is reported to the user terminal by means of dedicated signals, it is possible to report the system information of each transmission point without linking the system information of each transmission point and the index numbers of CSI-RS transmission parameters with each other. In this case, on the user terminal side, a predetermined system band to use for channel quality measurement is selected from the system information of each transmission point reported. For example, like above example 1, the user terminal selects adequate system information from each system information. That is, although the radio base station makes this selection with above example 1, here, the user terminal makes this selection. For example, when the radio base station reports a plurality of pieces of information (for example, a 5 MHz band and a 10 MHz band) to the user terminal as the system bandwidth, it is possible to select the minimum system bandwidth (in this case, the 5 MHz band) on the user terminal side and carry out channel quality measurement.

(Radio Communication System)

Figure 5:
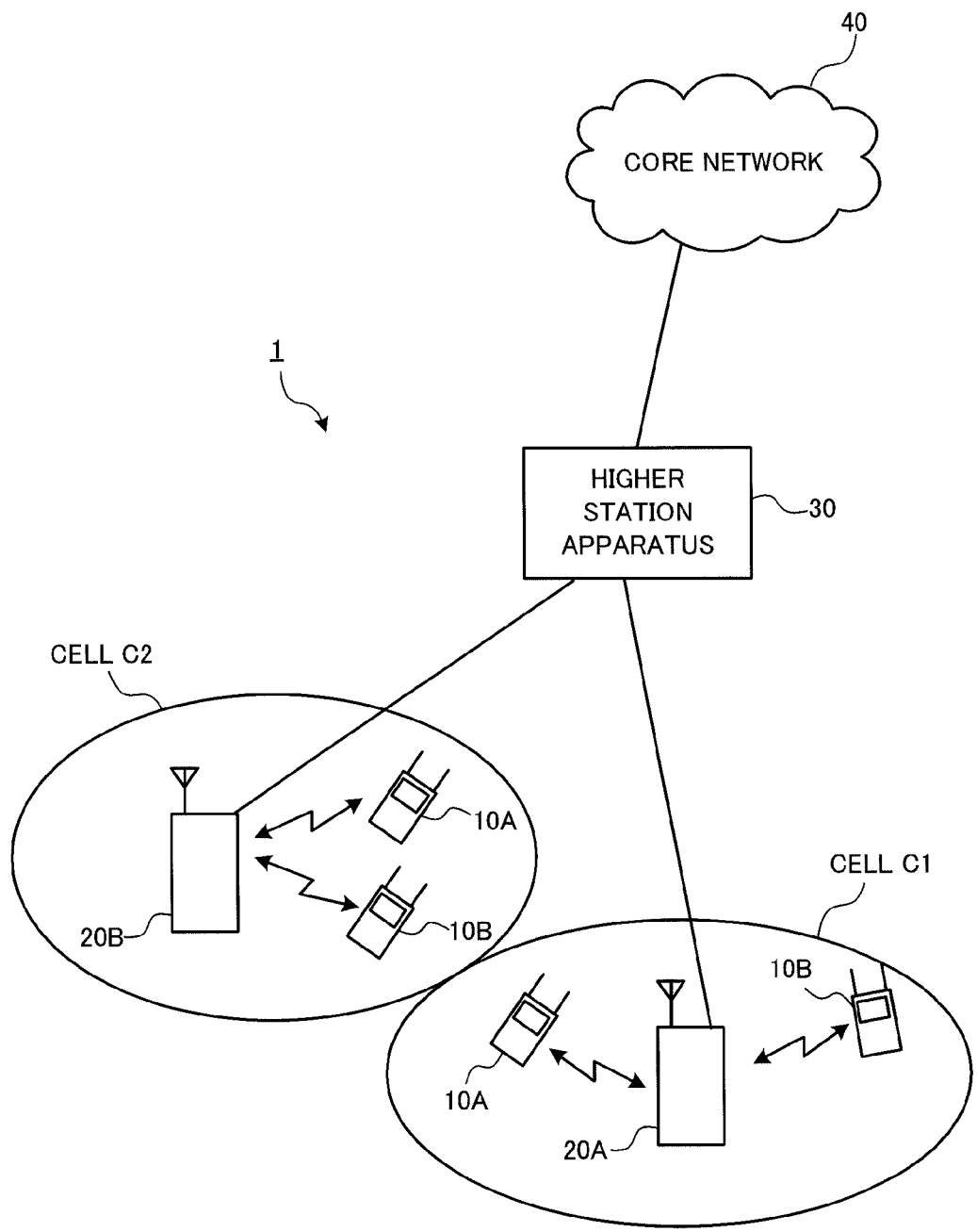
FIG. 5 is a diagram to explain a system configuration of a radio communication system.

Now, a radio communication system according to the present embodiment will be described in detail. FIG. 5 is a diagram to explain a system configuration of a radio communication system according to the present embodiment. Note that the radio communication system shown in FIG. 5 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 5, the radio communication system 1 is configured to include radio base stations 20A and 20B, and a plurality of first and second user terminals 10A and 10B that communicate with these radio base stations 20A and 20B. The radio base stations 20A and 20B are connected with a higher station apparatus 30, and this higher station apparatus 30 is connected with a core network 40. Also, the radio base stations 20A and 20B are connected with each other by wire connection or by wireless connection. The first and second user terminals 10A and 10B are able to communicate with the radio base stations 20A and 20B in cells C1 and C2. Note that the higher station apparatus 30 may be, for example, an access gateway apparatus, a radio network controller (RNC), a mobility management entity (MME) and so on, but is by no means limited to these.

Although the first and second user terminals 10A and 10B may be either LTE terminals or LTE-A terminals, the following description will be given simply with respect to the first and second user terminals unless specified otherwise. Also, although the first and second user terminals 10A and 10B will be described to perform radio communication with the radio base stations 20A and 20B for ease of explanation, more generally, user equipment (UE), including both mobile terminal apparatuses and fixed terminal apparatuses, may be used as well.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is used by the first and second user terminals 10A and 10B on a shared basis as a downlink data channel, and downlink L1/L2 control channels (PDCCH, PCFICH, PHICH). Transmission data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each user terminal on a shared basis as an uplink data channel, and a PUCCH (Physical Uplink Control Channel), which is an uplink control channel. By means of this PUSCH, transmission data and higher control information are transmitted. Furthermore, by means of the PUCCH, downlink radio quality information (CQI), ACK/NACK and so on are transmitted.

Figure 6:
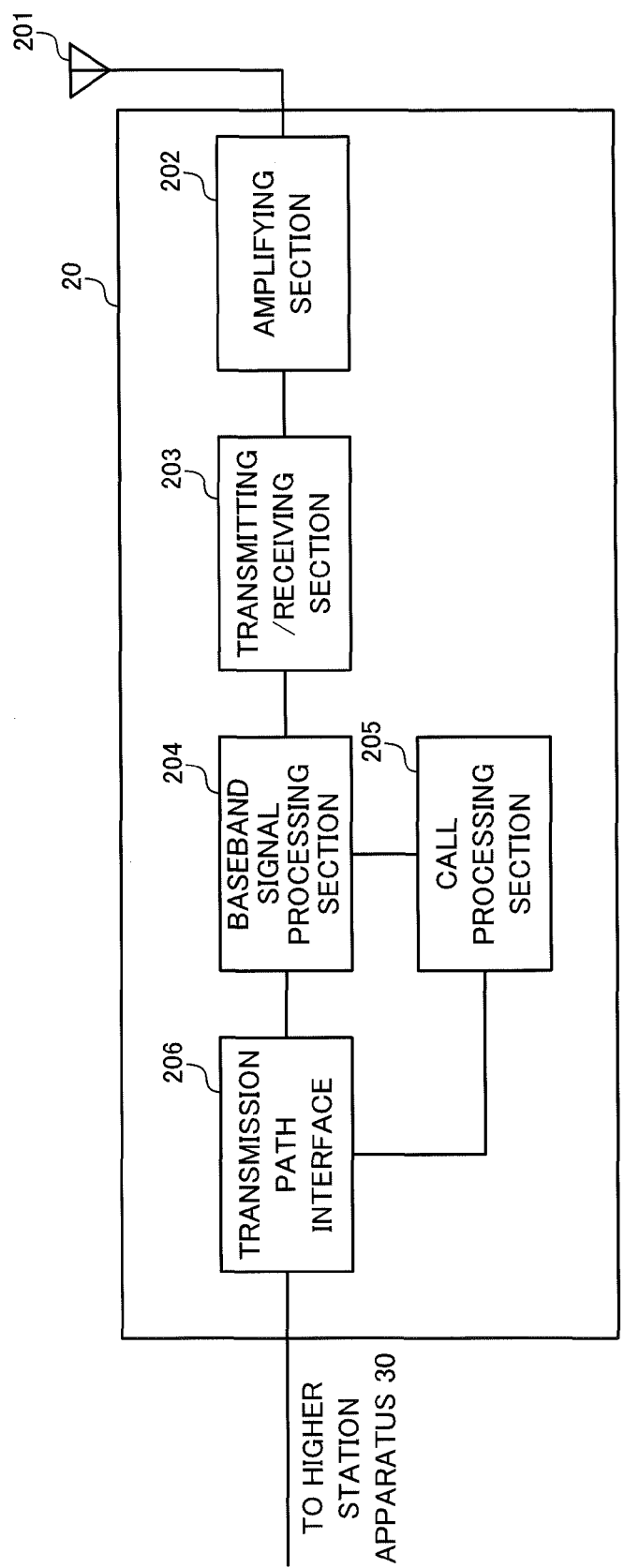
FIG. 6 is a diagram to explain an overall configuration of a radio base station.

Now, an overall configuration of a radio base station according to the present embodiment will be explained with reference to FIG. 6. Note that the radio base stations 20A and 20B have the same configuration and therefore hereinafter will be described simply as "radio base station 20." Also, the first and second user terminals 10A and 10B have the same configuration and therefore will be described simply as "user terminal 10." The radio base station 20 includes a transmitting/receiving antenna 201, an amplifying section 202, a transmitting/receiving section (reporting section) 203, a baseband signal processing section 204, a call processing section 205 and a transmission path interface 206. Transmission data to be transmitted from the radio base station 20 to the user terminal on the downlink is input from the higher station apparatus 30, into the baseband signal processing section 204, via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station 20, to the user terminals 10 connected to the same cell, by a broadcast channel. The information for allowing communication in the cell includes, for example, the uplink or downlink system bandwidth, root sequence identification information (root sequence index) for generating random access preamble signals in the PRACH (Physical Random Access Channel), and so on.

A baseband signal that is output from the baseband signal processing section 204 is converted into a radio frequency band in the transmitting/receiving section 203. The amplifying section 202 amplifies the radio frequency signal having been subjected to frequency conversion, and outputs the result to the transmitting/receiving antenna 201.

Meanwhile, as for a signal to be transmitted from the user terminal 10 to the radio base station 20 on the uplink, a radio frequency signal that is received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the radio base station 20 and manages the radio resources.

Figure 7:
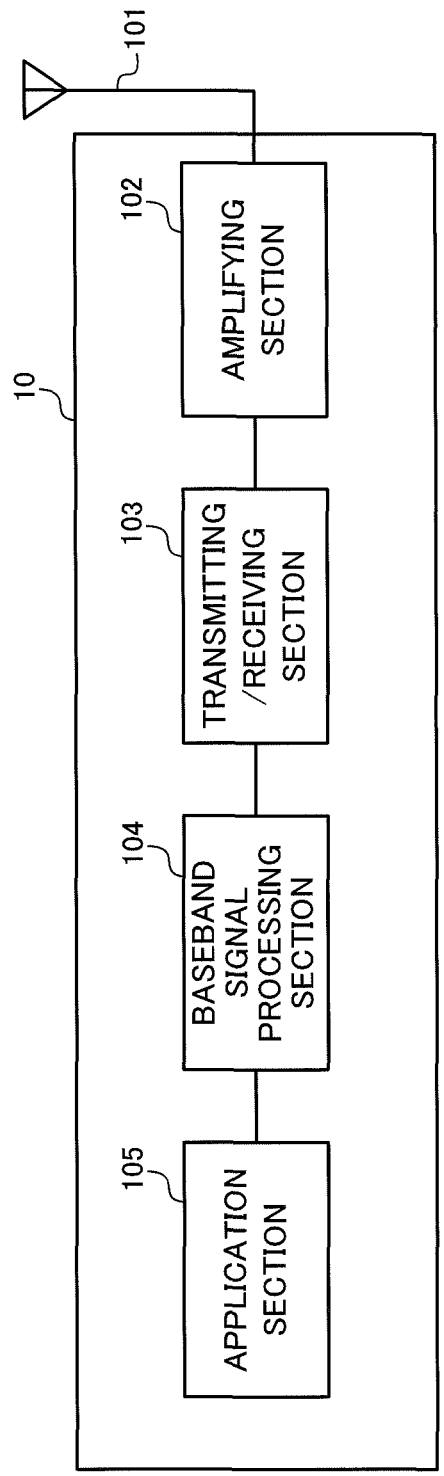
FIG. 7 is a diagram to explain an overall configuration of a user terminal.

Next, an overall configuration of a user terminal according to the present embodiment will be described with reference to FIG. 7. An LTE terminal and an LTE-A terminal have the same hardware configurations in principle parts, and therefore will be described indiscriminately. A user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. A baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 8:
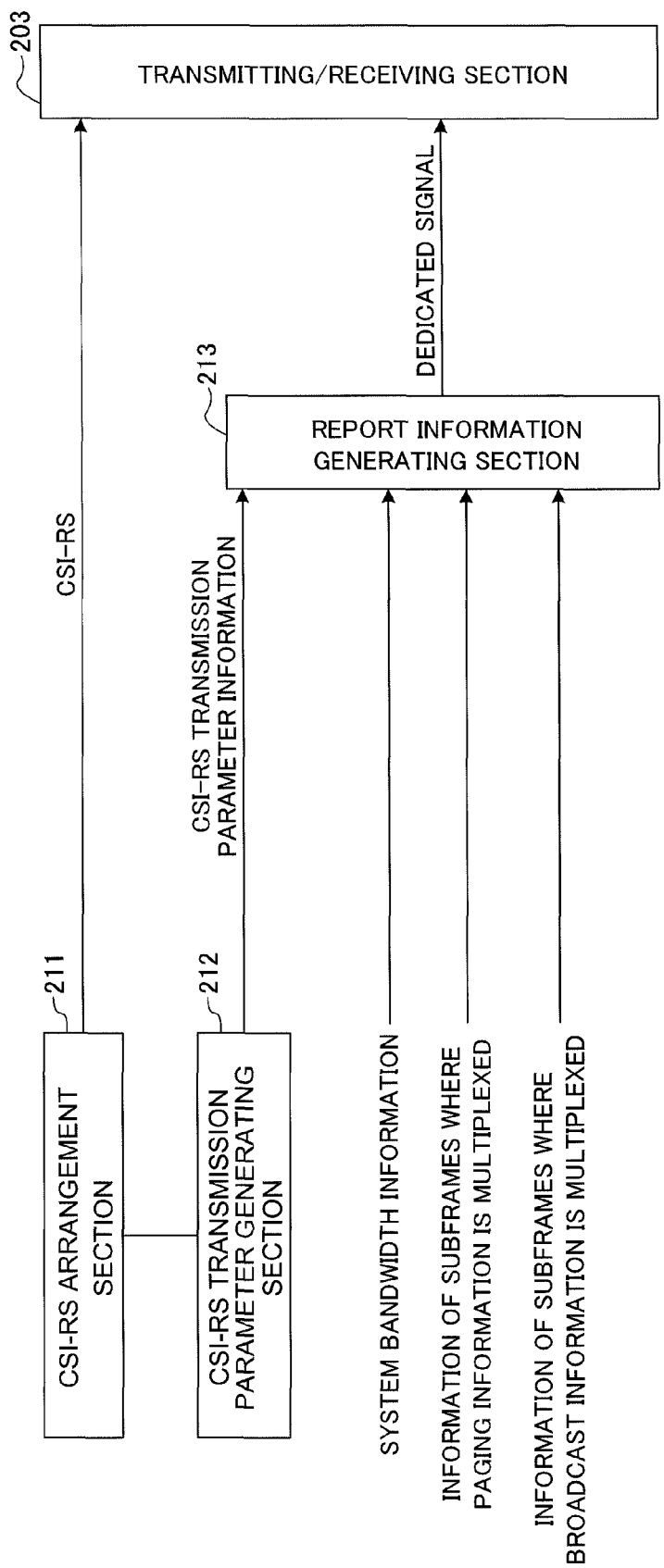
FIG. 8 is a functional block diagram corresponding to a radio communication method by a radio base station.

Function blocks of a radio base station will be described with reference to FIG. 8. Note that the function blocks of FIG. 8 are primarily the processing content of the baseband processing section. Also, the functional block diagram of FIG. 8 is a simplified one, and is assumed to have configurations which a baseband processing section should normally have. Also, in the following description, the indices for specifying the resources where CSI-RSs are arranged will be described as CSI-RS indices.

As shown in FIG. 8, the radio base station 20 has a CSI-RS arrangement section 211, a CSI-RS transmission parameter generating section 212, and a report information generating section 213.

The CSI-RS arrangement section 211 arranges CSI-RSs, in accordance with the number of CSI-RS ports, in CSI-RS transmission resources in resource blocks.

The CSI-RS transmission parameter generating section 212 generates transmission parameters (the position, sequence, transmission power and so on) for specifying the CSI-RSs. The CSI-RS transmission parameters generated in the CSI-RS parameter generating section 212 are output to the report information generating section 213.

The report information generating section 213 generates report information (dedicated signals) that is formed with information to represent the CSI-RS transmission parameters and the system information of transmission points that transmit the CSI-RSs. The system information may include the system bandwidth, information about subframes where broadcast information (MIBs and/or SIBs) is multiplexed, and information about subframes where paging information is multiplexed. Also, the number of CSI-RS antenna ports may be included as well. Also, the report information generating section 213 can generate, in addition to report information that includes the CSI-RS transmission parameters of its own cell (serving cell) and the system information of its own cell, report information that includes the CSI-RS transmission parameters of a neighboring cell having the same cell ID and the system information of that neighboring cell.

The report information generated in the report information generating section 213 is reported to the user terminal, via the transmitting/receiving section 203, by means of dedicated signals (higher layer signaling).

Figure 9:
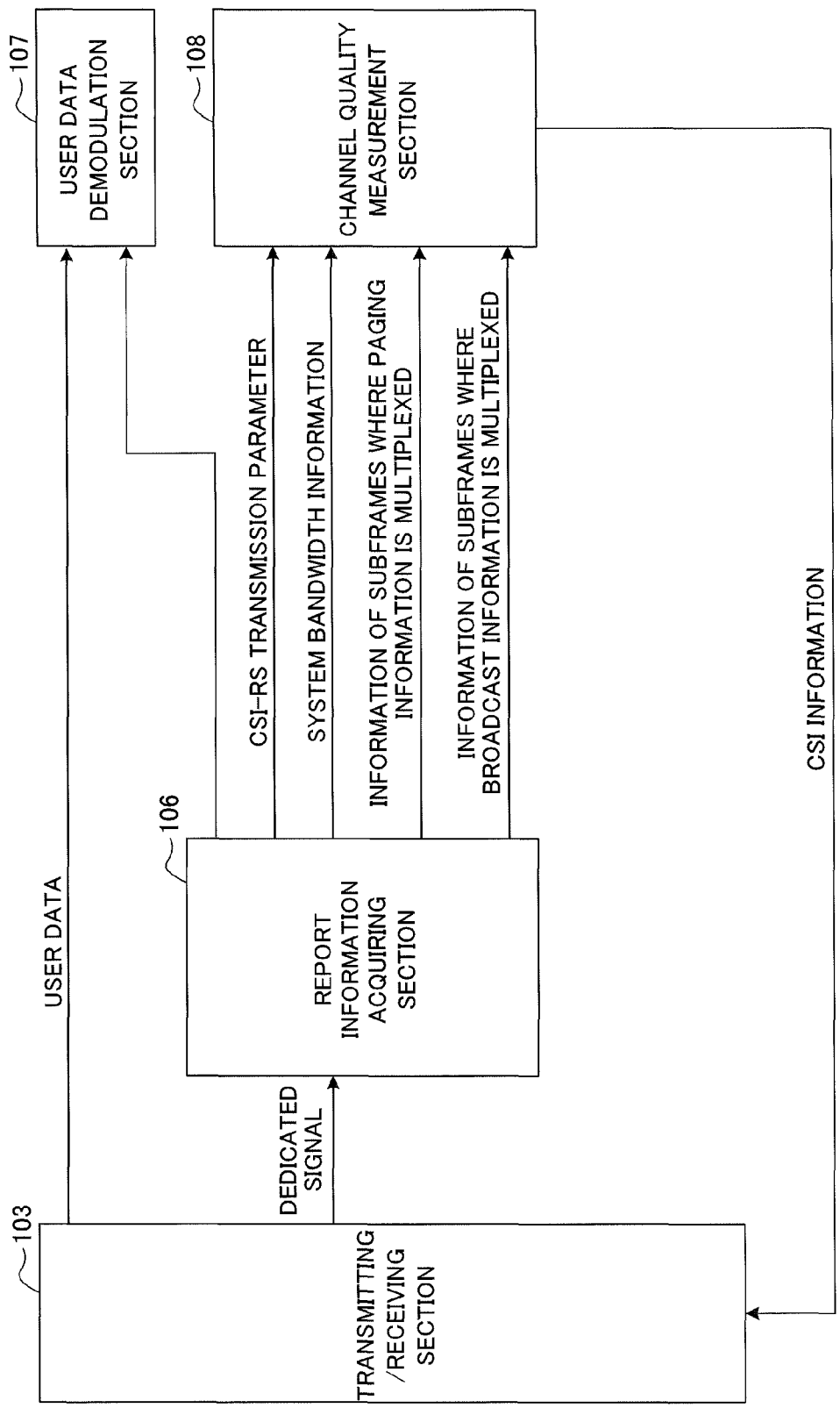
FIG. 9 is a functional block diagram corresponding to a radio communication method by a user terminal.

FIG. 9 is a diagram to explain function blocks to allow the user terminal to measure channel quality (primarily CQIs). Note that the function blocks of FIG. 9 are primarily the processing content of the baseband processing section. Also, the function blocks shown in FIG. 9 are simplified to explain the present invention, and assumed to have the configurations that a baseband processing section normally has.

As shown in FIG. 9, the user terminal 10 has a transmitting/receiving section 103, a report information acquiring section 106, a user data demodulation section 107, and a channel quality measurement section 108. The transmitting/receiving section 103 receives CSI-RSs and report information (dedicated signals) from the radio base station 20.

The user data demodulation section 107 demodulates the user data received via the transmitting/receiving section 103. Note that, instead of providing the user data demodulation section 107, the user data demodulation process may be performed in the report information acquiring section 106.

The report information acquiring section 106 demodulates the report information (dedicated signals) and acquires the CSI-RS transmission parameters, the system bandwidth, information about subframes where paging is multiplexed, information about subframes where broadcast information (MIBs and SIBs and so on) is multiplexed, and so on. The report information acquiring section 106 outputs the acquired information to the channel quality measurement section 108.

The channel quality measurement section 108 measures channel quality using the CSI-RS transmission parameters, the system information (system bandwidth and so on) of the transmission points having transmitted the CSI-RSs, and finds CSI from the measured channel quality. In this case, since CSI-RSs are not multiplexed in subframes where paging information or broadcast information is multiplexed, channel quality is not measured, and instead channel quality is measured using the CSI-RSs of other subframes. The channel quality measurement section 108 outputs the measured CSI information to the transmitting/receiving section 103.

The transmitting/receiving section 103 transmits the CSI information output from the channel quality measurement section 108 to the connecting radio base station. Also, the channel quality measurement section 108 measures the channel quality of neighboring cells where the cell ID is the same, in addition to the channel quality of its own cell (serving cell).

The present invention is by no means limited to the above embodiments and can be implemented in various modifications. For example, in the above embodiments, the first embodiment and the second embodiment may be adopted in adequate combinations, and the first example and the second example in the second embodiment may be implemented in adequate combinations as well. Besides, the present invention can be implemented with various changes, without departing from the scope of the present invention.

The disclosure of Japanese Patent Application No. 2012-081483, filed on Mar. 30, 2012, including the specification, drawings and abstract, is incorporated herein by reference in its entirety.

The invention claimed is:

1. A radio communication method for a plurality of radio base stations and a user terminal having ability to receive a reference signal for channel state measurement from the plurality of radio base stations, the radio communication method comprising:
gathering, in a predetermined radio base station, system information of each radio base station to generate report information and reporting the generated report information to the user terminal as a predetermined information element, by using higher layer signaling; and
measuring, in the user terminal, channel quality based on the received report information, wherein
the predetermined radio base station selects system information to be used in the user terminal from the gathered system information and incorporates the selected system information into the report information,
the system information includes at least one of a system bandwidth, information of a subframe where a broadcast signal is multiplexed, information of a subframe where paging information is multiplexed, and information of a number of antenna ports of the reference signal, and
the predetermined radio base station selects and reports a minimum system bandwidth among system bands of the radio base stations as the system bandwidth.

2. The radio communication method according to claim 1, wherein the predetermined information element is an information element defining a user-specific physical channel configuration, and the information element is included in a connection reconfiguration signal.

3. The radio communication method according to claim 1, wherein the predetermined radio base station reports, as the information of the subframe where paging information is multiplexed, information of a subframe where paging information is multiplexed in at least one of the radio base stations.

4. The radio communication method according to claim 1, wherein the predetermined radio base station reports the minimum number of antenna ports among the numbers of antenna ports of reference signals applied to the radio base stations.

5. The radio communication method according to claim 1, wherein the predetermined radio base station reports system information of each of the plurality of radio base stations.

6. The radio communication method according to claim 1, wherein the plurality of radio base stations respectively form a plurality of cells of the same cell ID.

7. A radio communication system comprising:
a plurality of radio base stations; and
a user terminal having ability to receive a reference signal for channel state measurement from the plurality of radio base stations,
wherein a predetermined radio base station of the plurality of radio base stations includes a radio base station processor that gathers system information of each radio base station to generate report information, and
a transmitter/receiver that reports the generated report information to the user terminal as a predetermined information element by using higher layer signaling, and
the user terminal includes a user terminal processor that measures channel quality based on the received report information,
the radio base station processor selects system information to be used in the user terminal from the gathered system information and incorporates the selected system information into the report information,
the system information includes at least one of a system bandwidth, information of a subframe where a broadcast signal is multiplexed, information of a subframe where paging information is multiplexed, and information of a number of antenna ports of the reference signal, and
the radio base station processor selects and reports a minimum system bandwidth among system bands of the radio base stations as the system bandwidth.

8. A radio base station in a radio communication system having a plurality of radio base stations and a user terminal having ability to receive a reference signal for channel state measurement from the plurality of radio base stations, the radio base station comprising:
a radio base station processor that gathers system information of each radio base station to generate report information; and
a transmitter/receiver that reports the generated report information to the user terminal as a predetermined information element by using higher layer signaling,
wherein the radio base station processor selects system information to be used in the user terminal from the gathered system information and incorporates the selected system information into the report information,
the system information includes at least one of a stem bandwidth, information of a subframe where a broadcast signal is multiplexed, information of a subframe where paging information is multiplexed, and information of a number of antenna ports of the reference signal, and
the radio base station processor selects and reports a minimum system bandwidth among system bands of the radio base stations as the system bandwidth.

9. A user terminal that receives a reference signal for channel state measurement transmitted from a plurality of radio base stations, the user terminal comprising:
a transmitter/receiver that receives report information transmitted from a predetermined radio base station of the plurality of radio base stations as a predetermined information element by using higher layer signaling, the report information being generated by gathering system information of each radio base station; and
a user terminal processor that measures channel quality based on the received report information, wherein the system information includes at least one of a system bandwidth, information of a subframe where a broadcast signal is multiplexed, information of a subframe where paging information is multiplexed, and information of a number of antenna ports of the reference signal, and the predetermined radio base station selects and reports a minimum system bandwidth among system bands of the radio base stations as the system bandwidth.

10. A radio communication method for a plurality of radio base stations and a user terminal having ability to receive a reference signal for channel state measurement from the plurality of radio base stations, the radio communication method comprising:

gathering, in a predetermined radio base station, system information of each radio base station to generate report information and reporting the generated report information to the user terminal as a predetermined information element, by using higher layer signaling; and measuring, in the user terminal, channel quality based on the received report information, wherein the predetermined radio base station selects system information to be used in the user terminal from the gathered system information and incorporates the selected system information into the report information, the system information includes at least one of a system bandwidth, information of a subframe where a broadcast signal is multiplexed, information of a subframe where paging information is multiplexed, and information of a number of antenna ports of the reference signal, and the predetermined radio base station reports a minimum number of antenna ports among the numbers of antenna ports of reference signals applied to the radio base stations.

11. The radio communication method according to claim 10, wherein the predetermined information element is an information element defining a user-specific physical channel configuration, and the information element is included in a connection reconfiguration signal.

12. The radio communication method according to claim 10, wherein the predetermined radio base station reports, as the information of the subframe where paging information is multiplexed, information of a subframe where paging information is multiplexed in at least one of the radio base stations.

13. The radio communication method according to claim 10, wherein the predetermined radio base station reports system information of each of the plurality of radio base stations.

14. The radio communication method according to claim 10, wherein the plurality of radio base stations respectively form a plurality of cells of the same cell ID.

15. A radio communication system comprising:

a plurality of radio base stations; and a user terminal having ability to receive a reference signal for channel state measurement from the plurality of radio base stations, wherein a predetermined radio base station of the plurality of radio base stations includes a radio base station processor that gathers system information of each radio base station to generate report information, and a transmitter/receiver that reports the generated report information to the user terminal as a predetermined information element by using higher layer signaling, and the user terminal includes a user terminal processor that measures channel quality based on the received report information, the radio base station processor selects system information to be used in the user terminal from the gathered system information and incorporates the selected system information into the report information, the system information includes at least one of a system bandwidth, information of a subframe where a broadcast signal is multiplexed, information of a subframe where paging information is multiplexed, and information of a number of antenna ports of the reference signal, and the radio base station processor reports a minimum number of antenna ports among the numbers of antenna ports of reference signals applied to the radio base stations.

16. A radio base station in a radio communication system having a plurality of radio base stations and a user terminal having ability to receive a reference signal for channel state measurement from the plurality of radio base stations, the radio base station comprising:

a radio base station processor that gathers system information of each radio base station to generate report information; and a transmitter/receiver that reports the generated report information to the user terminal as a predetermined information element by using higher layer signaling, wherein the radio base station processor selects system information to be used in the user terminal from the gathered system information and incorporates the selected system information into the report information, the system information includes at least one of a system bandwidth, is formation of a subframe where a broadcast signal is multiplexed, information of a subframe where paging information is multiplexed, and information of a number of antenna ports of the reference signal, and the radio base station processor reports a minimum number of antenna ports among the numbers of antenna ports of reference signals applied to the radio base stations.

17. A user terminal that receives a reference signal for channel state measurement transmitted from a plurality of radio base stations, the user terminal comprising:

a transmitter/receiver that receives report information transmitted from a predetermined radio base station of the plurality of radio base stations as a predetermined information element by using higher layer signaling, the report information being generated by gathering system information of each radio base station; and a user terminal processor that measures channel quality based on the received report information, wherein the system information includes at least one of a system bandwidth, information of a subframe where a broadcast signal is multiplexed, information of a subframe where paging information is multiplexed, and information of a number of antenna ports of the reference signal, and the predetermined radio base station reports a minimum number of antenna ports among the numbers of antenna ports of reference signals applied to the radio base stations.

* * * * *